Sept. 17, 1940.   C. H. GREENEWALT   2,214,790
PROCESS AND APPARATUS FOR SEPARATING GASES
Filed July 5, 1935

INVENTOR.
Crawford H. Greenewalt
BY George W. Walker
ATTORNEY.

Patented Sept. 17, 1940

2,214,790

UNITED STATES PATENT OFFICE 2,214,790

PROCESS AND APPARATUS FOR SEPARATING GASES

Crawford H. Greenewalt, Wilmington, Del., assignor to E. I. du Pont de Nemours & Company, Wilmington, Del., a corporation of Delaware Application July 5, 1935, Serial No. 30,030

35 Claims. (Cl. 62—175.5)

This invention relates to the separation of the constituents of normally gaseous mixtures and more particularly to the recovery of ethylene from complex mixtures of gaseous hydrocarbons. This invention also relates to an improvement in the method of separating normally gaseous mixtures by liquefaction and fractionation and more particularly to the use of ammonia in such processes, both as a source of heat and of refrigeration.

The fundamental principles involved in the separation of gaseous mixtures have been known for a long time. For example, there are several well known methods of separating air into oxygen and nitrogen. These methods comprise compressing and cooling the air to effect liquefaction of all or a fraction thereof, following which the liquid formed is rectified by causing the vapors thereby to pass countercurrent to a stream of liquid in a fractionating column. The principle of "backward return" utilized by Claude in the separation of air and other gaseous mixtures is also familiar to those versed in the art. My invention involves in part the application of these well known methods to the separation of complex hydrocarbon mixtures and constitutes an improvement over existing processes.

This invention has as one object the provision of a method and an apparatus for the separation of mixtures of gases and especially of mixtures of hydrocarbon gases into their component parts. A further object is the recovery of substantially pure ethylene in nearly quantitative yields from complex mixtures of hydrocarbons gases such as usually accompany the thermal decomposition of petroleum products in the vapor phase. Still another object is the achievement of the above ends with minimum thermal losses and reduced power expenditures. A further object is the introduction of unique features in a liquefaction and rectification operation which permits simple and efficient control and ensures the maximum recovery of the desired constituents. A still further object is to increase the efficency of a refrigeration cycle in a liquefaction and fractionation process for the separation of gaseous mixtures. Another object is the provision of heat to liquefaction and fractionation operations in an economical and easily controlled manner. Other objects will appear hereinafter.

These objects are accomplished by the following invention. The specification and accompanying drawing show the preferred form of apparatus. It is to be understood that details of this apparatus which are well known to those skilled in the art have been omitted for the sake of clarity and that modifications in the details of construction and in the arrangement of parts may be made without departing from the spirit of my invention.

Figure 1:
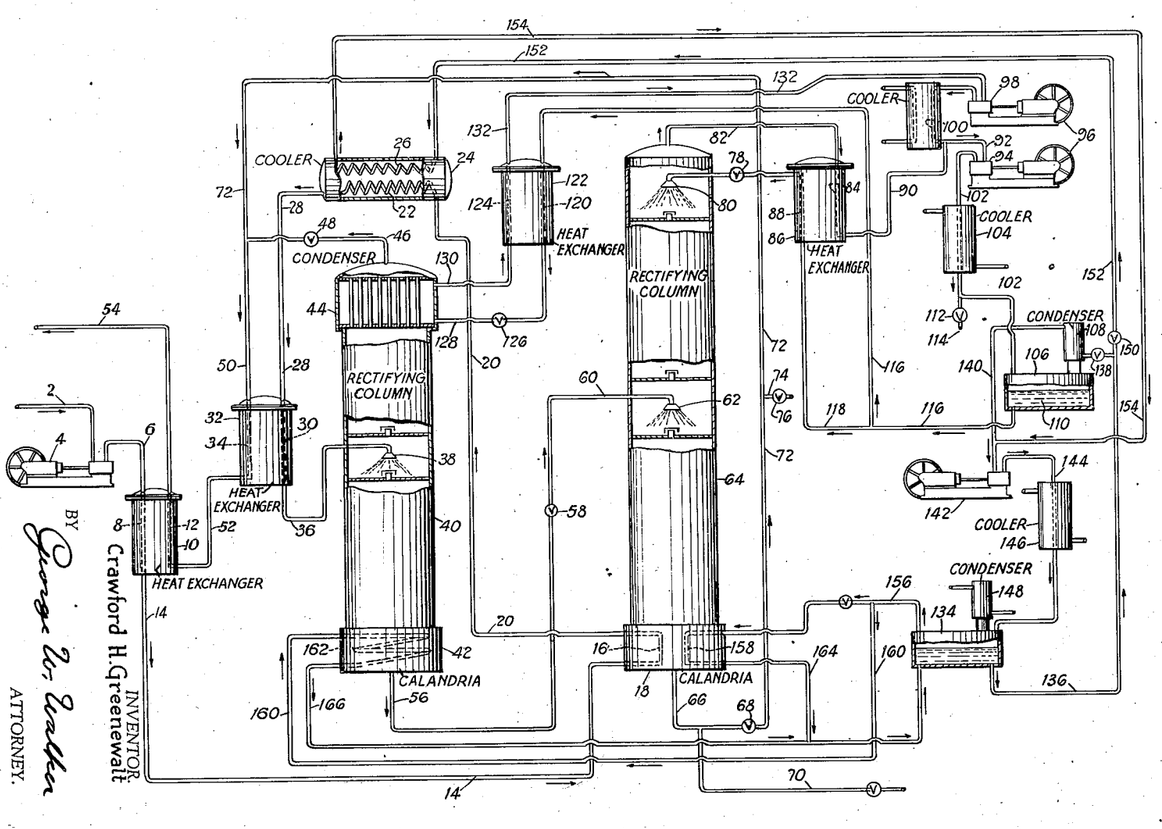
The accompanying drawing represents diagrammatically a complete apparatus for the separation of the components of a gaseous mixture. Reference will be made to this drawing in order to properly describe the invention.

The following represents a preferred embodiment of the process and apparatus. The gaseous mixture to be fractionated which may consist of hydrogen, methane, ethylene, ethane, propylene, propane, butylene, butane, etc., is drawn through pipe 2 from a source of gas supply which may, for example, be a petroleum cracking operation. The gas mixture then passes into compressor 4 where it is raised to a pressure exceeding 300 lbs. per square inch. From compressor 4 the gas is forced through pipe 6 and is treated to remove impurities in equipment not included diagrammatically. This step removes the water and other materials of high freezing points which might congeal and plug the equipment, as well as the materials such as H$_2$S which would effect a corrosive action. It is also advantageous at this point to recover high boiling constituents such as can be blended with gasoline. These preliminary treatments are not a part of this invention and therefore are not described here.

After passage through pipe 6 the gas is passed through section 8 of the heat exchanger 10 where its temperature is lowered by cooler separated products flowing countercurrent through section 12 of said heat exchanger. From section 8 of heat exchanger 10 the cooled gases are led through pipe 14 to section 16 of the calandria 18 where, by heat exchange with the liquid previously collected in the calandria, the gaseous mixture is further cooled, the heat extracted from said gaseous mixture aiding in the boiling of the liquid in the calandria 18. The gaseous mixture then passes by means of pipe 20 to section 22 of the heat exchanger 24 where additional cooling is effected by evaporation of a suitable refrigerant such as ammonia in section 26 of the heat exchanger 24. The mixture then passes from section 22 of heat exchanger 24 through pipe 28 to section 30 of heat exchanger 32, where further heat is removed by cooler separated products flowing through section 34 of said heat exchanger 32. The effluent from section 30, now consisting of a mixture of liquid and gas, is passed through pipe 36 and through opening 38 into rectifying column 40. The liquid descends in column 40 to calandria 42 where it is boiled. The vapors resulting from the boiling of the liquid rise from calandria 42 into the rectifying column 40, where they are mixed with the unliquefied portion of the gases issuing from opening 38.

The resulting mixture passes up through column 40 and into the tubes of condenser 44 where it is cooled to approximately the temperature of ethylene boiling at one atmosphere. A portion of the gaseous mixture arising in the tubes of condenser 44 is condensed and flows back into column 40. Hydrogen and methane, together with a little ethylene, leave condenser 44 via pipe 46 and are reduced in pressure to substantially one atmosphere in expansion valve 48. In some cases it may be expedient to effect this pressure reduction in an expansion engine. This mixture of low pressure gases, the temperature of which has been greatly reduced by the above expansion, is joined by other cooled materials from pipe 72 and the resulting mixture passed through pipe 50 into section 34 of heat exchanger 32, where it removes heat from the mixture flowing through section 30 of the same heat exchanger. The exit gases from section 34 of heat exchanger 32 are conveyed through pipe 52 to section 12 of heat exchanger 10. The temperature of these gases is still relatively low in comparison with that of the crude compressed gas entering the system and this temperature differential is utilized to precool the entering gases in heat exchanger 10. The gas mixture from section 12 of said heat exchanger 10 is removed from the system through pipe 54 and conveyed to a suitable gas holder or directly to an operation where advantage may be taken of its fuel value.

The cooling of the incoming gases from pipe 6 to the rectifying column 40 is so regulated that it will condense that amount of liquid substantially equal to the fraction of the gaseous mixture corresponding to ethylene and the higher boiling hydrocarbons. This regulation is a part of my invention and affords an extremely efficient operation of the first rectifying system.

The cold liquid descending into column 40 from condenser 44 is rectified by intimate contact with warm vapors ascending said column. The rectified liquid collecting in calandria 42, now essentially free from hydrogen and methane, is withdrawn through pipe 56 to expansion valve 58 where a substantial reduction in pressure is made. The cooled mixture is then forced through pipe 60 and opening 62 into the rectifying column 64. The liquid portion of the material fed into the column through opening 62, together with the additional liquid descending from the upper portion of the column collects in calandria 18, where by exchange of heat with a relatively hot gaseous mixture passing through section 16 and also by exchange with supplemental warm vapors flowing through the second section 158 of this same calandria, it is boiled to such an extent that the ethylene is expelled. The boiling liquid in calandria 18, now free from ethylene, but containing ethane, propylene, butylene, butane, etc., is withdrawn via pipe 66. From pipe 66 this liquid may be conducted via pipe 70 to another system for the further recovery of components therefrom or the liquid may be passed through expansion valve 68 where the pressure is dropped to about one atmosphere and the resulting cold low pressure mixture may be carried by means of pipe 72 and pipe 50 out of the rectifying system along with the methane and hydrogen. If it is desired, the low pressure mixture coming from expansion valve 68 may be withdrawn through pipe 74 and valve 76 to additional processing equipment.

The vapors rising from the boiling liquid in calandria 18, together with the uncondensed gases introduced into the column at opening 62, are scrubbed in the upper portion of column 64 by descending liquid ethylene which is admitted at the top of the column through expansion valve 78 and opening 80. The cold vapors emerging from the top of the column 64 through pipe 82 are led through section 84 of heat exchanger 86 where the low temperature of this effluent gas is utilized to precool the liquid in section 88 of the said heat exchanger prior to its expansion and introduction into column 64. The off-gas issuing from the top of the column 64 through pipe 82 and heat exchanger 86 is substantially pure ethylene. It now passes through pipe 90 to the suction pipe 92 of the stage 94 of compressor 96 where it is joined with ethylene at the same pressure from the stage 98 of compressor 96. This ethylene from stage 98 has the heat of compression removed from it by the intercooler 100 prior to being mixed with the ethylene in suction pipe 92. The ethylene in compressor 96 is compressed to about 40 atmospheres and then is forced through pipe 102 and water cooler 104 into the ethylene receiver 106.

The ammonia cooled condenser 108 above the ethylene receiver 106 serves to condense the ethylene to a liquid which collects at 110. A constant volume of liquid ethylene is maintained in receiver 106 by bleeding compressed gaseous ethylene through valve 112 and pipe 114 to suitable containers or directly to processes in which it serves as a raw material. In this manner ethylene may be obtained as a product of my process.

The liquid ethylene 110 in receiver 106 is withdrawn through pipe 116 and the branching pipe 118 to be used in the system. Through pipe 116 the liquid ethylene passes to section 120 of the heat exchanger 122 where the liquid is cooled by countercurrent exchange with the cold ethylene vapors flowing through section 124 of said heat exchanger. The precooled liquid from the section 120 is expanded to about atmospheric pressure by means of the expansion valve 126 and passes through pipe 128 into the space surrounding the tubes in condenser 44. The liquid portion of the expanded mixture evaporates in condenser 44 and bathes the condenser tube with boiling ethylene and thus effects the condensation of reflux liquid within the condenser tubes. The ethylene vapors emerging from condenser 44 through pipe 130 and section 124 pass in countercurrent relationship to the incoming liquid ethylene in heat exchanger 122 as explained above. The vapors from section 124 of heat exchanger 122 are withdrawn through pipe 132 by stage 98 of compressor 96, which raises the pressure to about 10 atmospheres. The compressed ethylene gas coming from the stage 98 is mixed with the ethylene draw-off gas from column 64 in a manner previously described above.

The liquid ethylene drawn off from pipe 116 by the branching conduit 118 passes through section 88 of the heat exchanger 86 where it is cooled by the cold vapors emerging through pipe 82 from the top of column 64. The cold liquid ethylene is then passed through the expansion valve 78 where its pressure is reduced from 40 to 10 atmospheres, after which it is introduced into the top of column 64 through opening 80, as previously described. The portion of this incoming ethylene which is flashed to vapor during passage through expansion valve 78 is joined by the ethylene vapor ascending column 64 and the total gaseous effluent vented through the top of the column via pipe 92. A portion of the ethylene is then withdrawn from the system and the remainder condensed and utilized to furnish refrigeration for the columns 40 and 64 in the manner outlined above. The liquid portion of the mixture obtained after expansion of ethylene through valve 78 and opening 80 descends in column 64 as a reflux and scrubs the vapors arising from the boiling liquid in calandria 18 and from the opening 62.

The condenser 108 on the ethylene receiver 106 is cooled by means of liquid ammonia withdrawn from the ammonia receiver 134 through pipe 136 to expansion valve 138. The ammonia vapors from condenser 108 are drawn off by pipe 140 from whence it is delivered to the compressor 142. The compressed ammonia vapors then pass through pipe 144 and water cooler 146 to the ammonia receiver 134. Partial condensation of the ammonia vapors entering receiver 134 is accomplished in the water-cooled condenser 148. Liquid ammonia from line 136 also passes through expansion valve 150 into line 152 and section 26 of heat exchanger 24 where its vaporization is utilized to remove heat from the incoming mixture of crude gases passing through section 22 of said heat exchanger. The ammonia vapor evaporated in section 26 of heat exchanger 24 is conveyed by pipe 154 to the suction side of compressor 142 where it is joined by the ammonia vapor coming from condenser 108 through pipe 140. The mixture is then compressed and returned to the ammonia receiver as has been described.

The ammonia vapor from receiver 134 is also passed through pipe 156 into section 158 of calandria 18 where it condenses and the heat thus removed is used to assist in boiling the liquid in calandria 18. Some of the ammonia vapor is drawn off from pipe 156 through branching conduit 160 and thus through section 162 of calandria 42 where it condenses and the heat thus removed is used to boil the liquid in that calandria. The condensed liquid ammonia from calandrias 18 and 42 passes through pipes 164 and 166, respectively, and is thus returned to the ammonia receiver 134.

The following example specifically illustrates the process of my invention and shows the actual operating conditions used to separate the components of a particular gas mixture:

A gas mixture was introduced into the system by way of pipe 2 and compressed to approximately 32 atmospheres. This gas mixture was obtained by the removal of water vapor and hydrocarbons boiling in the gasoline range (principally those hydrocarbons having five, six and seven carbon atoms) from a crude gas obtained by cracking petroleum oil. Said gas mixture had the following composition:

| | Mol per cent |
|---|---|
| $H_2$ | 8.3 |
| $CH_4$ | 31.7 |
| $C_2H_4$ | 30.1 |
| $C_2H_6$ | 14.5 |
| $C_3H_6+C_3H_8$ | 14.3 |
| $C_4H_8$ | 1.1 |

The compressed gas was then cooled by means of the various heat exchangers to a temperature of $-41°$ C. At this temperature and pressure over 50% of the gaseous mixture was condensed and the resulting gas and liquid mixture was introduced into the rectifying column 40 via pipe 36. The liquid descended the column and was boiled in calandria 42 by the condensing of ammonia vapors in coil 162. This boiling expelled the hydrogen and methane completely and gave a liquid fraction of the following composition:

| | Mol per cent |
|---|---|
| $H_2$ | 0 |
| $CH_4$ | 0 |
| $C_2H_4$ | 49.2 |
| $C_2H_6$ | 24.5 |
| $C_3H_6+C_3H_8$ | 24.2 |
| $C_4H_8$ | 2.1 |

This liquid fraction was withdrawn from the rectifying column 40 via pipe 56.

A constant pressure was maintained in the rectifying column 40 by expanding (via pipe 46 and expansion valve 48) the gases issuing from the top of the backward return condenser 44 from the pressure of 32 atmospheres to substantially one atmosphere pressure. Condenser 44 was maintained at a temperature of about $-100°$ C. by boiling therein ethylene at one atmosphere pressure. The composition of the vent gases was as follows:

| | Mol per cent |
|---|---|
| $H_2$ | 20.2 |
| $CH_4$ | 77.9 |
| $C_2H_4$ | 1.9 |

A reflux ratio, i. e., ratio of mols of liquid overflow to mols of drawoff at the top of the column 40, of 1.09 to 1.0 was used to achieve the separation indicated above. The liquid drawn off by pipe 56 from the base of the rectifying column 40 was reduced in pressure from 32 atmospheres to 10 atmospheres and introduced into rectifying column 64. The liquid which accumulated at the base of rectifying column 64 in calandria 18 was heated at a temperature of about $-5°$ to $0°$ C. by means of the incoming gas in coil 16 and condensation of ammonia vapors in coil 158. At this temperature all of the ethylene was expelled and the liquid contained about 40.85 mol per cent $C_2H_6$, 47.9 mol per cent $C_3H_6+C_3H_8$, and 3.6 mol per cent $C_4H_8$. This liquid fraction, freed of ethylene, was removed from the calandria 18 via pipe 66.

The vapors passing upward in the rectifying column 64 from the boiling liquid in the calandria, together with the uncondensed gases introduced with the feed, were scrubbed with a cold liquid ethylene spray directed into the top of the column by way of opening 80. This liquid ethylene reduced the temperature of the gases to about $-53°$ C. and caused the condensation of all the constituents thereof, except ethylene vapor. The ethylene vapor was withdrawn from the top of the column by way of pipe 82, passed in heat exchange 86 relationship with the liquid ethylene to be sprayed into the column and was compressed to 40 atmospheres pressure in the second stage 94 of the two-stage compressor 96. The ethylene at 40 atmospheres pressure was then cooled with water 104 and with boiling ammonia 108 and was thus condensed. The liquid ethylene accumulated in the receiving vessel 106 at a temperature of about $-10°$ C. A constant volume of the liquid was maintained in the receiver by withdrawing the ethylene, either as a liquid or a gas, as desired. Over 95% of the ethylene in the gas feed to the system was recovered as a product of 98.5 to 99.5% purity. The purified ethylene may be withdrawn from any point in the ethylene refrigeration system depending on the pressure and phase condition at which the product is desired.

Liquid ethylene was also withdrawn from the receiver and used as the refrigerant in both of the rectifying columns. It was cooled to about −25° C. in heat exchanger 86, then expanded from 40 atmospheres to 10 atmospheres pressure and admitted directly to the rectifying column 64 as a reflux in the manner described above. A reflux ratio of 3.0 to 1.0 was used in this column.

In the case of column 40, liquid ethylene was expanded from 40 atmospheres to one atmosphere pressure in condenser 44 and allowed to boil therein. The ethylene vapor from condenser 44 was drawn off via pipe 130 and compressed in two stages (98 and 94) and returned to the liquid ethylene receiver 106. Before expansion into condenser 44, the liquid ethylene was cooled to −35° C. by heat exchange 122 with the effluent ethylene vapors from said condenser.

It is to be understood that the above serves merely as an illustration of my invention and that when gas mixtures of different compositions are handled it may be expedient to enlarge or multiply some of the steps. Moreover, the number and arrangement of the heat exchangers may be varied as the process requires. However, the description which has been given will suffice to illustrate the underlying principles of my invention.

It will be noted that the incoming compressed gas is cooled and partially liquefied in a series of heat exchangers before rectification is attempted and that, while most of this cooling is effected by means of colder separated products and cold fractions in the course of rectification, a portion of the heat is removed with an outside refrigerant such as boiling ammonia. It is not essential to the success of the invention to accomplish the partial cooling of the incoming gaseous mixture in this manner. It is quite possible to operate column 40 satisfactorily even though the temperature of the feed mixture varies over a very wide range for it is possible to remove the heat by the condenser 44 of column 40 by supplying more refrigeration there. It has been found, however, that the temperature at which the feed enters the column exerts a considerable influence on the cooling required at the top. It is part of my invention to operate in such a manner that the cooling of the incoming gases from pipe 6 to the rectifying column 40 is so regulated that it will condense that amount of liquid substantially equivalent to the fraction of the gaseous mixture corresponding to the ethylene and the higher boiling hydrocarbons. I have found that by so doing I will be able to operate with minimum refrigeration at condenser 44 and thus provide a marked savings in operation cost. It is, of course, evident that refrigeration at the low temperature level maintained in condenser 44 of column 40 is much more expensive to supply than is the cooling at the temperature of boiling ammonia.

It has been found that in the separation of ethylene as described above, the ethylene losses are almost inconsequential when the operating pressure of column 40 is about 32 atmospheres. This loss can be reduced by operating at somewhat higher pressures, but it is undesirable to use pressures greatly in excess of the above figure because of the increased reflux ratios required to produce the desired separation. Operation at substantially lower pressures, for example at 25 atmospheres, is accompanied by materially increased losses of ethylene in the vent gases.

It is preferred to operate the second rectifying column, in which ethylene is fractionated from the higher boiling materials, at a pressure below 300 pounds per square inch and preferably at about 8 to 10 atmospheres. It is, nevertheless, possible to operate at pressures on both sides of the above preferred range. The use of a lower pressure increases refrigeration costs while the employment of a pressure above that indicated increases the necessary reflux ratio but lowers the unit cost of refrigeration somewhat, since it is introduced at a higher temperature level.

In most processes for the separation of gas mixtures similar to those which the present invention is intended to handle, the separation is accomplished in several steps involving fractional condensation and fractional distillation, using rectifying columns to assist in the separation and heat exchangers to conserve power. In these well known processes heat is removed at each rectification stage and it has been the usual practice to operate a separate refrigeration cycle in conjunction with each rectification stage in order to absorb the heat of the vapors condensing in the concentrating sections of each rectifying column. For example, in certain processes for recovering ethylene from mixtures of gaseous hydrocarbons, a methane cycle is employed to supply the necessary cooling to the column in which methane and hydrogen are removed from the higher boiling materials. An auxiliary cycle is used to furnish reflux to the second column.

My invention has the great advantage of accomplishing the same results with a single refrigeration cycle, using a single component refrigerant, which is in fact the principal separated product. This permits a considerable saving in equipment cost, especially of expensive compression apparatus, and lowers heat losses and power consumption. In addition to reducing equipment and maintenance costs, the difficulties of operation and control attending the use of a plurality of refrigeration cycles, are greatly decreased. The precooling of the liquid ethylene prior to its use for column refrigeration is also beneficial. Heat losses and power expenditures are reduced by this method of operation and the temperature of the vaporized refrigerant is raised to such an extent in this precooling arrangement that a relatively inexpensive type of compressor construction may be used.

The system as a whole lends itself to fairly simple control which may be made completely automatic if desired. Ethylene, the principal product, is recovered in a substantially pure state in nearly quantitative yields.

Special mention has been made of the use of ammonia in applying my invention. It is, however, also advantageous to follow the same general procedure outlined above when other refrigerating mediums are employed. In this connection, mention may be made of such refrigerants as sulfur dioxide, propane, etc. It is, of course, obvious that the pressure of the hot refrigerant vapor must be sufficient to insure a condensing temperature which is in excess of the boiling liquid fraction which is to dissipate this heat of condensation.

The use of a refrigerant such as ammonia as a source of process heat has several important advantages. A considerable saving in cooling water, which would otherwise be used for condensing the ammonia, is effected. The rate of heat input to a distillation unit can be very readily regulated by varying both the pressure of the refrigerant vapor and its rate of input to rectification columns. My invention is also of great advantage in the distillation of materials boiling below 0° C. where, owing to the danger of freezing, steam cannot be used directly.

A super-condenser cooled to a temperature lower than the ammonia condenser 108 may be connected directly to the top of said ammonia condenser or to the top of the ethylene receiver. This super-condenser or "purge drum" will allow the purging from the system of any methane or other non-condensible gases that may inadvertently find their way into the ethylene refrigeration system. The condenser may be operated in any conventional manner.

It is apparent that many widely different embodiments of this invention may be made without departing from the spirit and scope thereof and, therefore, it is not intended to be limited except as indicated in the appended claims.

I claim:

1. In the process of separating the constituents of a normally gaseous mixture by at least two stages of rectification, each stage of rectification being conducted at a substantially different pressure, the improvement which comprises effecting the cooling to provide refluxing liquids in each stage of rectification by the same refrigerant, said refrigerant being allowed to expand and vaporize at a pressure corresponding to the temperature desired for the cooling section in each rectifying system.

2. In the process of separating the constituents of a normally gaseous mixture by at least two stages of rectification, the improvement which comprises effecting the cooling to provide reflux liquids in each stage of rectification by the same refrigerant, said refrigerant being allowed to expand and vaporize at a substantially different pressure in each rectifying system, said pressure corresponding to the temperature desired in the cooling section of each rectifying system.

3. In the process of separating the constituents of a normally gaseous mixture by at least two stages of rectification, each stage of rectification being conducted at a substantially different pressure, the improvement which comprises carrying out the rectification in each succeeding rectifying stage at a pressure substantially lower than that carried out in the preceding rectifying stage and effecting the cooling to provide refluxing liquids in each stage of rectification by the same refrigerant.

4. In the process of separating the constituents of a normally gaseous mixture by two stages of rectification, each stage of rectification being conducted at a substantially different pressure, the improvement which comprises effecting the cooling to provide refluxing liquids in both rectifying systems by a refrigerant consisting of the low-boiling product of the second rectifying system.

5. In the process of separating the constituents of a normally gaseous mixture by at least two stages of rectification, each stage of rectification being conducted at a substantially different superatmospheric pressure, the improvement which comprises effecting the cooling to provide refluxing liquids in each rectifying system by the same refrigerant, said refrigerant being allowed to expand and vaporize at a substantially different pressure in each rectifying system, said pressure corresponding to the temperature desired in the cooling section of each rectifying system.

6. In the process of separating the constituents of a normally gaseous mixture by at least two stages of rectification, the improvement which comprises providing reflux liquors in each stage of rectification by means of the same fluid, said fluid being allowed to expand and vaporize in heat exchange relationship with, but out of contact with, the gases in one rectifying system and being sprayed directly in contact with the gases in the other rectifying system.

7. In the process of separating the constituents of a normally gaseous mixture by at least two stages of rectification, each stage of rectification being conducted at a different superatmospheric pressure, the improvement which comprises providing refluxing liquids in each rectifying system by the same fluid, said fluid being allowed to expand and vaporize in heat exchange relationship with, but out of contact with, the gases in the first rectifying system and being sprayed directly in contact with the gases in the second rectifying system.

8. In the process of separating the constituents of a normally gaseous mixture by two stages of rectification, each stage of rectification being conducted at a different superatmospheric pressure, the improvement which comprises carrying out the rectification in the second system at a pressure lower than that carried out in the first system and providing refluxing liquids in both rectifying systems by means of the low-boiling product of the second rectifying system, the said low-boiling product being in liquid form and being allowed to expand and vaporize in heat exchange relationship with, but out of contact with, the gases in the first rectifying system, and being sprayed directly in contact with the gases in the second rectifying system.

9. The process according to claim 8, characterized in that the gaseous mixture to be separated is a hydrocarbon mixture.

10. In the process of separating the constituents of a gaseous mixture comprising hydrogen, methane, ethylene and higher boiling hydrocarbons by at least two stages of rectification, each stage of rectification being conducted at a different superatmospheric pressure, the improvement which comprises providing refluxing liquids in each stage of rectification by means of liquid ethylene, said ethylene being allowed to expand and vaporize in heat exchange relationship with, but out of contact with, the gases in the first rectifying system and being sprayed directly in contact with the gases in the second rectifying system.

11. In the process of separating the constituents of a gaseous mixture comprising hydrogen, methane, ethylene, and higher boiling hydrocarbons by at least two stages of rectification, each stage of rectification being conducted at a different superatmospheric pressure, the improvement which comprises carrying out the fractionation in each succeeding rectifying stage at a superatmospheric pressure lower than that carried out in the preceding rectifying stage and effecting the cooling to provide refluxing liquids in each stage of rectification by a refrigerant consisting of liquid ethylene.

12. In the process of separating the constituents of a gaseous mixture comprising hydrogen, methane, ethylene and higher boiling hydrocarbons by at least two stages of rectification, each stage of rectification being conducted at a different superatmospheric pressure, the improvement which comprises effecting the cooling to provide refluxing liquids in each rectifying system by a refrigerant consisting of liquid ethylene, said refrigerant being allowed to expand and vaporize at a pressure corresponding to the temperature desired in the cooling section of each rectifying system.

13. In the process of separating the constituents of a gaseous mixture comprising hydrogen, methane, ethylene, and higher boiling hydrocarbons by two stages of rectification, each stage of rectification being conducted at a different superatmospheric pressure, carrying out the rectification in the second system by a pressure lower than that carried out in the first system and providing refluxing liquids in both rectifying systems by means of liquid ethylene, the said ethylene being allowed to expand and vaporize in heat exchange relationship with, but out of contact with, the gases in the first rectifying system, and being sprayed directly in contact with the gases in the second rectifying system.

14. The process of separating the components of a gaseous mixture comprising ethylene and higher and lower boiling constituents, which comprises compressing the gaseous mixture and cooling to partially liquefy same, rectifying the resulting fluid mixture by counter-current flow of condensed liquids therefrom so as to separate the lowest boiling constituents as a gaseous fraction and ethylene and the higher boiling constituents as a liquid fraction in one rectifying system, reducing the pressure on the liquid fraction so obtained, then further rectifying, in a second rectifying system, this fraction so as to separate ethylene from the higher boiling constituents, compressing and condensing the ethylene and effecting the cooling to provide refluxing liquids in both systems by a refrigerant consisting of a portion of the liquid ethylene.

15. The process of separating the components of a gaseous mixture comprising ethylene and higher and lower boiling constituents, which comprises compressing the gaseous mixture and cooling to partially liquefy same, rectifying the resulting fluid mixture by countercurrent flow of condensed liquids therefrom so as to separate the lowest boiling constituents as a gaseous fraction and ethylene and the higher boiling constituents as a liquid fraction in one rectifying system, reducing the pressure on the liquid fraction so obtained, then further rectifying, in a second rectifying system, this fraction so as to separate ethylene from the higher boiling constituents, system and being sprayed directly in contact with compressing and cooling said ethylene to liquefy same, expanding and vaporizing a portion of this liquid ethylene in heat exchange relationship with, but out of contact with, the gases being condensed in the first rectifying system, returning the ethylene thus used to be again compressed, cooled and liquefied, spraying a portion of the liquid ethylene in direct contact with the gases being condensed in the second rectifying system.

16. The process of separating the components of a gaseous mixture comprising ethylene and higher and lower boiling constituents, which comprises compressing the gaseous mixture and cooling to partially liquefy same, rectifying the resulting fluid mixture by countercurrent flow of condensed liquids therefrom so as to separate the lowest boiling constituents as a gaseous fraction and ethylene and the higher boiling constituents as a liquid fraction in one rectifying system, reducing the pressure on the liquid fraction so obtained, then further rectifying in a second rectifying system this fraction to separate ethylene from the higher boiling constituents, withdrawing ethylene vapor from the top of the second rectifying system, compressing and cooling said ethylene to liquefy same, expanding and vaporizing a portion of this liquid ethylene in heat exchange relationship with, but out of contact with, the gas being condensed in the first rectifying system followed by recompressing the vaporized ethylene and liquefying same, spraying a portion of said liquid ethylene directly into the top of the second rectifying system to provide a reflux liquid therefor.

17. The process according to claim 8, characterized in that the liquid refrigerant used in each stage of rectification is passed in heat exchange relationship with the spent refrigerant gas coming from said system.

18. The process according to claim 15, characterized in that the ethylene is expanded and vaporized in the first fractionating system at a pressure of about one atmosphere.

19. The process according to claim 15, characterized in that the first rectifying system is operated at a pressure between 300 and 650 pounds per square inch, and that the second rectifying system is operated at a pressure between one atmosphere and about thirty atmospheres.

20. In the process of separating the constituents of a gaseous mixture by cooling said gaseous mixture to partially liquefy same and then subjecting the resulting fluid to at least two stages of rectification, each stage of rectification being conducted at a different pressure, the improvement which comprises cooling said gaseous mixture in the initial cooling step to such a degree as to condense that amount of liquid which is substantially equal to the fraction comprising the higher boiling constituents separated in the first stage of rectification and cooling the rectified gases at the top of each stage of rectification by means of the same refrigerant so as to provide refluxing liquors in each of said stages, said refrigerant being allowed to expand and vaporize in heat exchange relationship with, but out of contact with, the gases in one of the rectifying systems and being sprayed directly in contact with the gases in the other rectifying system.

21. The process of separating the constituents of a gaseous mixture comprising hydrogen, methane, ethylene, and higher boiling hydrocarbons, which comprises compressing said gaseous mixture, cooling the compressed gases to such a degree as to condense that amount of liquid which is substantially equal to the fraction of gases containing ethylene and the higher boiling constituents, rectifying the gas and liquid mixture by countercurrent flow of condensed liquids therefrom so as to separate ethylene and the higher boiling constituents as a liquid and methane and hydrogen as a gas, reducing the pressure on the liquid fraction so obtained, then further rectifying in a second rectifying system this fraction so as to separate ethylene from the higher boiling constituents, cooling the rectified gases at the top of each of the rectifying systems with liquid ethylene so as to provide refluxing liquors in each system, the said liquid ethylene being allowed to expand and vaporize in heat exchange relationship with, but out of contact with, the gases in the first rectifying the gases in the second rectifying system.

22. The process according to claim 21, characterized in that the ethylene refrigerant is expanded and vaporized in heat exchange relationship with, but out of contact with, the gases in the first rectifying system, and said refrigerant is sprayed in direct contact with the gases of the second rectifying system.

23. The process of separating the constituents of a gaseous mixture comprising hydrogen, methane, ethylene, and higher boiling constituents, which comprises compressing said gaseous mixture to a pressure between 300 and 600 pounds per square inch, cooling said compressed gases to between −60° C. and −20° C., depending upon the pressure, to form a gas and liquid mixture, rectifying the gas and liquid mixture by countercurrent flow of condensed liquids therefrom to separate ethylene and the higher boiling constituents as a liquid and hydrogen and methane as a gas, reducing the pressure on the liquid fraction to between 15 and 300 pounds per square inch, then further rectifying, in a second rectifying system, this fraction to separate ethylene from the higher boiling constituents, compressing and cooling said ethylene to liquefy same, expanding and vaporizing a portion of this liquid ethylene in heat exchange relationship with, but out of contact with, the gases being condensed in the first rectifying system, returning the ethylene thus used to be again compressed, cooled, and liquefied, spraying a portion of the liquid ethylene in direct contact with the gases being condensed in the second rectifying system.

24. The process of separating the constituents of a gaseous mixture, which comprises compressing said gaseous mixture and cooling to partially liquefy same, rectifying in at least two stages the resulting fluid mixture by countercurrent flow of reflux liquids and by boiling the liquid at the base of the rectifying column in order to establish refluxing conditions and expel the gaseous fraction in each stage, operating each succeeding stage at a pressure lower than the preceding stage, and recovering the gaseous fraction from the second rectifying system by compressing, cooling, and liquefying same, expanding a liquid refrigerant in heat exchange relationship with both the gaseous mixture in the initial cooling step and the gaseous fraction in the final cooling step, compressing the gaseous refrigerant resulting from these two cooling steps and passing this gaseous refrigerant in heat exchange relationship with the liquid fractions being boiled in the rectifying systems so as to remove heat from the gaseous refrigerant, liquefying said refrigerant and returning the liquid refrigerant to the cooling steps, thus repeating the cycle.

25. The process of separating the constituents of a gaseous mixture comprising hydrogen, methane, ethylene, and higher boiling hydrocarbons, which comprises compressing the gaseous mixture, cooling the compressed gases to such a degree as to condense that amount of liquid which is substantially equal to the fraction of gases consisting of ethylene and the higher boiling constituents, said cooling being aided by expanding a liquid refrigerant in heat exchange relationship with the gaseous mixture, rectifying the resulting gas and liquid mixture so as to separate ethylene and the higher boiling constituents as a liquid and methane and hydrogen as a gas, said rectification being effected by boiling the liquid at the base of the rectifying column in order to establish refluxing conditions and expel the gaseous fraction, reducing the pressure on the liquid fraction thus separated and further rectifying, in a second rectifying system, this fraction to separate the ethylene from the higher boiling hydrocarbons, withdrawing ethylene vapor from the top of the second rectifying system, compressing and cooling same by expanding a liquid refrigerant in heat exchange relationship therewith, compressing the gaseous refrigerant obtained from the two cooling steps, passing this compressed gaseous refrigerant in heat exchange relationship with the liquid fractions being boiled in the two rectifying systems so as to remove heat from the gaseous refrigerant, liquefying said refrigerant and then returning the liquid refrigerant to the cooling steps, thereby repeating the refrigeration cycle.

26. The process of separating the constituents of a gaseous mixture comprising hydrogen, methane, ethylene, and higher boiling hydrocarbons, which comprises compressing the gaseous mixture, cooling the compressed gases to such a degree as to condense that amount of liquid which is substantially equal to the fraction of gases consisting of ethylene and the higher boiling constituents, said cooling being aided by expanding liquid ammonia in heat exchange relationship with the gaseous mixture, rectifying the resulting gas and liquid mixture so as to separate ethylene and the higher boiling constituents as a liquid and methane and hydrogen as a gas, said rectification being effected by a countercurrent flow of reflux liquors condensed at the top of a rectifying column and by boiling the liquid at the base of the rectifying column in order to expel the gaseous fraction, the cooling at the top of the rectifying column being effected by expanding and vaporizing liquid ethylene in heat-exchange relationship with, but out of contact with, the gases at said top of column, reducing the pressure on the liquid fraction separated by said fractionating column and further rectifying, in a second rectifying system, this fraction to separate the ethylene from the higher boiling hydrocarbons, effecting rectification in the second rectifying system by spraying liquid ethylene into the top of said system to provide a reflux liquor therefor, and by boiling the liquid at the bottom of said system in order to remove the ethylene, withdrawing ethylene vapor from the top of the second rectifying system, compressing said ethylene vapor and cooling same by expanding liquid ammonia in heat exchange relationship therewith, compressing the gaseous ammonia obtained from the two cooling steps, passing this compressed gaseous ammonia in heat exchange relationship with the liquid fractions being boiled in the two rectifying systems so as to remove the heat of compression from the gaseous ammonia, liquefying said ammonia and then returning the liquid ammonia to the cooling steps, thereby repeating the refrigeration cycle.

27. An apparatus for separating the components of a gaseous mixture which comprises the following elements in combination: a still comprising a calandria, a rectifying column, and a condenser, means for conducting fluids into the rectifying column, means for removing the gaseous fraction from the top of the rectifying column, means for removing the liquid bottoms from the calandria, a heat exchanger connected with the said means for introducing the fluid into the rectifying column to aid in the cooling of said fluid, means for conducting a refrigerant into said heat exchanger and means for conducting the refrigerant from said heat exchanger, pressure means for compressing the spent refrigerant, means for passing at least a part of the compressed refrigerant in heat exchange relationship with the liquid bottoms in the calandria so as to effect cooling of said refrigerant, and means for removing the cooled refrigerant from the calandria.

28. An apparatus for separating the components of a gaseous mixture which comprises the following elements in combination: a heat exchanger, an expansion valve, a compressor and a still comprising a calandria, a rectifying column and a condenser, a conduit for passing the fluids to be rectified into the heat exchanger, a second conduit passing from said heat exchanger into said rectifying column so as to conduct the fluids from said heat exchanger into the rectifying system, a third conduit for removing the gaseous fraction from the top of the condenser, and a fourth conduit for removing the liquid bottoms from the calandria, a fifth conduit for conducting a refrigerant from the expansion valve into the said heat exchanger so as to cause the cooling of the fluids prior to fractionation, a sixth conduit conducting the spent refrigerant from the heat exchanger to the compressor, a seventh conduit conducting the compressed refrigerant into the calandria in heat exchange relationship with the liquid bottoms contained therein so as to effect cooling of said refrigerant therein, and an eighth conduit for conducting the cooled refrigerant from the calandria.

29. An apparatus for the separation of the components of a gaseous mixture comprising the following elements in combination: a condenser and a still comprising a calandria, a rectifying column, means for conducting fluids into the rectifying column, means for conducting the liquid bottoms from the calandria, means for removing the gaseous fraction from the top of the rectifying column, compressing same and passing same through said condenser, means for passing a refrigerant through said condenser to effect cooling therein, means for compressing the spent refrigerant, passing same in heat exchange relationship with the liquid bottoms in the calandria, and means for returning the cooled refrigerant to the refrigeration cycle.

30. An apparatus for the separation of the components of a gaseous mixture comprising the following elements in combination: two compressors, a condenser, an expansion valve, a still comprising a calandria and a rectifying column, a conduit passing into said rectifying column for conducting the fluid mixture to be rectified into the rectifying column, a second conduit for conducting the liquid bottoms from the calandria, a third conduit for conducting the gaseous fraction from the top of the rectifying column and to one of the compressors, a fourth conduit for conducting the compressed gaseous fraction from said compressor to said condenser where the gaseous fraction is liquefied, a fifth conduit for conducting a refrigerant from said expansion valve into the condenser so as to effect the cooling of the said gaseous fraction, a sixth conduit conducting the spent refrigerant from the condenser to the second compressor, a seventh conduit for conducting the compressed refrigerant from said second compressor into the calandria in heat exchange relationship with the liquid bottoms therein, and an eighth conduit conducting the cooled refrigerant from the calandria.

31. An apparatus for separating the components of a gaseous mixture comprising the following elements in combination: two stills, the first still comprising a calandria, a rectifying column and a backward return condenser, and a second still comprising a calandria and a rectifying column, two coolers and two compressors, a conduit for conducting the fluid to be treated through one cooler and into the rectifying column of the first still, a second conduit for conducting the gaseous fraction from the top of the condenser of the first still, a third conduit for conducting the liquid bottoms from the calandria of the first still through an expansion valve into the rectifying column of the second still, a fourth conduit for conducting the liquid bottoms from the calandria of the second still, a fifth conduit for conducting the gaseous fractions from the top of the rectifying column of the second still to one compressor, and a sixth conduit for conducting the compressed gases from said first compressor to the second cooler, a branched conduit with an expansion valve in each branch for conducting a refrigerant to each of the two coolers and for returning the spent refrigerant to the second compressor, a second branched conduit for conducting the compressed refrigerant from the second compressor through the calandrias of the two stills in heat exchange relationship with the liquid bottoms therein and said second branched conduit returning the cooled refrigerant from the calandria to the refrigeration system.

32. An apparatus for separating the components of a gaseous mixture comprising the following elements in combination: two stills, the first still comprising a calandria, a rectifying column and a condenser, and the second still comprising a calandria and a rectifying column, two coolers and two compressors, a conduit for conducting the fluid to be rectified through one of the coolers and into the rectifying column of the first still, a second conduit for conducting the gaseous fraction from the top of the condenser of the first still, a third conduit for conducting the liquid bottoms from the calandria of the first still through an expansion valve into the rectifying column of the second still, a fourth conduit for conducting the liquid bottoms from the calandria of the second still, a fifth conduit for conducting the gaseous fraction from the top of the rectifying column of the second still to one of the compressors, a sixth conduit for conducting the compressed vapors from this compressor to the second cooler so as to liquefy same, a branched conduit for conducting this liquefied fraction, one branch of said branched conduit conducting said liquefied fraction through an expansion valve and into the condenser of the first still so as to effect cooling therein, a seventh conduit for returning the vapors resulting from the expansion of this liquid fraction to the second compressor, means for returning the compressed gases from the second compressor to the first compressor, the second branch of said branched conduit conducting the said liquefied fraction to the top of the rectifying column of the second still, and means for introducing said liquefied fraction as a spray into the top of the said rectifying column of the second still to provide refluxing liquids therein.

33. In the process of separating the constituents of a normally gaseous, hydrocarbon mixture by at least two stages of rectification, each stage being conducted at a different superatmospheric pressure, the improvement which comprises effecting the cooling to provide refluxing liquids in each rectifying system by the same refrigerant, said refrigerant being allowed to expand and vaporize in heat relationship with, but out of contact with, the gases in the first rectifying system and being sprayed directly in contact with the gases in the second rectifying system.

34. In the process of separating the constituents of a normally gaseous hydrocarbon mixture by at least two stages of rectification, each stage being conducted at a different superatmospheric pressure, the improvement which comprises passing a portion of the condensate from the overhead products of the second rectifying system through the condenser providing reflux for the first rectifying system whereby said overhead products act as an indirect refrigeration medium and passing another portion of the condensate directly to the top of the second rectifying system to provide reflux therein.

35. In the process of separating constituents of a normally gaseous hydrocarbon mixture by at least two stages of rectification, each stage being conducted at a different superatmospheric pressure, the improvement which comprises effecting the cooling to provide reflux liquids in the first rectifying system by an indirect refrigeration medium comprising essentially a fluid of the composition of the condensate of the overhead product of the second rectifying system, and adding a fluid of like composition directly to the top of the second rectifying system to provide reflux therein.

CRAWFORD H. GREENEWALT.

CERTIFICATE OF CORRECTION.

Patent No. 2,214,790. September 17, 1940.

CRAWFORD H. GREENEWALT.

It is hereby certified that error appears in the printed specification of the above numbered patent requiring correction as follows: Page 6, first column, line 63, claim 15, strike out the words "system and being sprayed directly in contact with" and insert the same after "rectifying" on page 7, first column, line 7, claim 21; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.